US009164646B2

(12) United States Patent  
Cheng et al.

(10) Patent No.: US 9,164,646 B2  
(45) Date of Patent: Oct. 20, 2015

(54) METHOD AND APPARATUS FOR ACCOMMODATING DISPLAY MIGRATION AMONG A PLURALITY OF PHYSICAL DISPLAYS

(75) Inventors: Jeffrey G. Cheng, Toronto (CA); Xiaoqing Frederick Li, Toronto (CA)

(73) Assignee: ATI Technologies ULC, Markham (CA)

( * ) Notice: Subject to any disclaimer, the term of this patent is extended or adjusted under 35 U.S.C. 154(b) by 846 days.

(21) Appl. No.: 12/872,859

(22) Filed: Aug. 31, 2010

(65) Prior Publication Data

US 2012/0050260 A1   Mar. 1, 2012

(51) Int. Cl.
*G06T 15/00* (2011.01)
*G09G 5/00* (2006.01)
*G06F 3/0481* (2013.01)
*G06F 3/14* (2006.01)
*G09G 3/00* (2006.01)
*G09G 5/14* (2006.01)

(52) U.S. Cl.
CPC .......... *G06F 3/0481* (2013.01); *G06F 3/04815* (2013.01); *G06F 3/1438* (2013.01); *G09G 3/003* (2013.01); *G06F 2203/04802* (2013.01); *G09G 5/14* (2013.01); *G09G 2340/12* (2013.01); *G09G 2360/06* (2013.01)

(58) Field of Classification Search
CPC .................... G06F 3/1438; G06F 2203/04802; G06F 2203/04804; G06F 3/04815; G06F 3/0481; G09G 2340/12; G09G 2360/06; G09G 3/003; G09G 5/14; G09G 3/00
See application file for complete search history.

(56) References Cited

U.S. PATENT DOCUMENTS

| | | | |
|---|---|---|---|
| 5,678,015 A * | 10/1997 | Goh | 715/782 |
| 5,880,733 A | 3/1999 | Horvitz et al. | |
| 6,460,278 B1 * | 10/2002 | Jurjavcic | 40/473 |
| 6,717,556 B2 * | 4/2004 | Asahi et al. | 345/1.1 |
| 7,134,095 B1 | 11/2006 | Smith et al. | |
| 2003/0179243 A1 | 9/2003 | Numano | |
| 2003/0210285 A1 | 11/2003 | Numano | |
| 2008/0143731 A1 * | 6/2008 | Cheng et al. | 345/502 |
| 2008/0231546 A1 | 9/2008 | Li | |
| 2010/0293504 A1 * | 11/2010 | Hachiya | 715/806 |

OTHER PUBLICATIONS

Machine translated JP, 2006-350755. Asahi et al., Dec. 28, 2006.*

(Continued)

*Primary Examiner* — Kee M Tung
*Assistant Examiner* — Sing-Wai Wu
(74) *Attorney, Agent, or Firm* — Faegre Baker Daniels LLP

(57) ABSTRACT

A method and apparatus provides for the accommodation of display migration among a plurality of physical displays. In one example, the method and apparatus detects a display migration condition from at least a second physical display to a first physical display. The method and apparatus then controls compositing of a plurality of desktop surfaces so as enable access of each one of the plurality of desktop surfaces on the first physical display. The plurality of desktop surfaces include at least a desktop surface associated with the second physical display. The desktop surface is the content in a piece of memory in a frame buffer, which represents all the display content presented on the associated physical display. In one example, the plurality of desktop surfaces may be composited into at least one three-dimensional display object. The three-dimensional display object includes but is not limited to a revolving door object or other three-dimensional shape or object (e.g., a cube object).

27 Claims, 10 Drawing Sheets

(56) References Cited

OTHER PUBLICATIONS

"Compositing window manager"; from Wikipedia http://en.wikipedia.org/wiki/Compositing_window_manager; Jun. 24, 2010; pp. 1-7.

International Search Report and Written Opinion; International Application No. PCT/CA2011/000986; dated Nov. 29, 2011.

State Intellectual Property Office of the People's Republic of China, Notification of the First Office Action for Chinese Patent Application No. 201180042911.5 (related to above-captioned patent application), mailed Oct. 23, 2014 (30 pages).

European Patent Office, Extended European Search Report for European Patent Application No. 11820953.5 (related to above-captioned patent application), mailed Aug. 26, 2014 (8 pages).

* cited by examiner

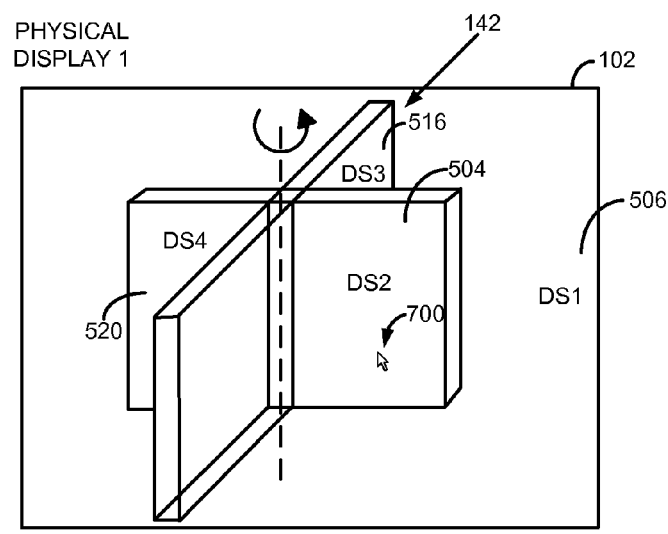
FIG. 9
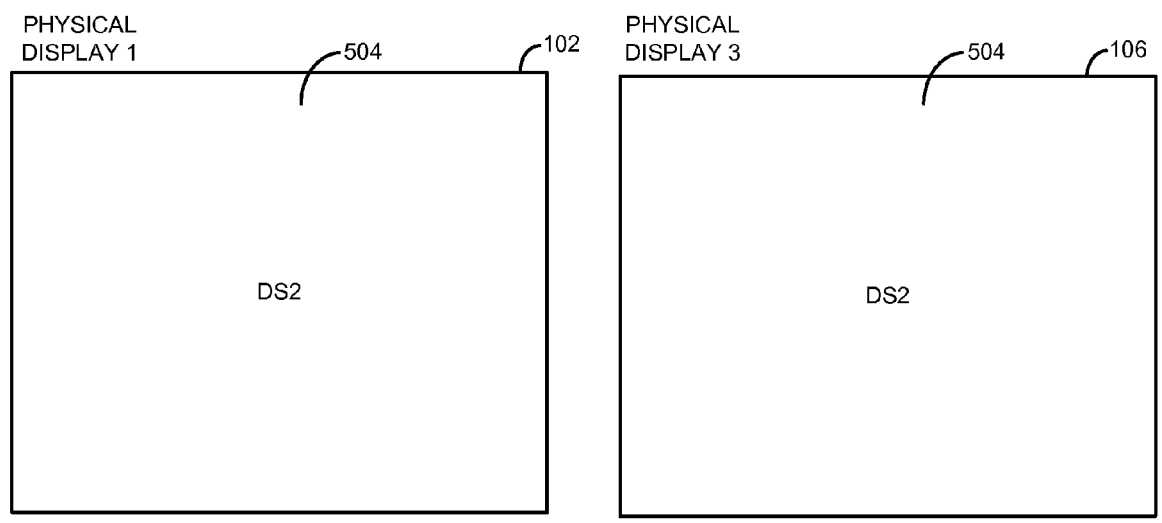
FIG. 10     FIG. 11

METHOD AND APPARATUS FOR ACCOMMODATING DISPLAY MIGRATION AMONG A PLURALITY OF PHYSICAL DISPLAYS

BACKGROUND OF THE DISCLOSURE

The disclosure relates generally to a method and apparatus for accommodating display migration, and more particularly, to a method and apparatus for accommodating display migration among a plurality of physical displays.

Computer systems such as desktop computers and laptop computers are known for having one or multiple graphic processors (e.g., GPU, graphic processing unit) that can drive multiple physical displays. Oftentimes, in certain situations, it would be desired to preserve the display content of all applications running on the computer system and to consolidate the display content presented on some or all of the physical displays onto one single or multiple physical displays. For example, some of the physical displays may be disconnected when the power source of the computer system changes from an AC power source to a DC power source resulting in a reduction of power supply driving the physical displays. In another example, some or all of the physical displays driven by one graphic processor may be disconnected when the computer system switches to another graphic processor that supports fewer physical displays.

In responding to these situations, known computer systems lose the desktop surfaces associated with the disconnected physical displays and thus, cannot preserve all the display content previously presented on the disconnected physical displays. The desktop surface is the content in a piece of memory in a frame buffer, which represents all the display content presented on the associated physical display. For example, some computer systems disregard the loss of the desktop surfaces associated with the disconnected physical displays, thereby losing all the display content on the disconnected physical displays.

In other computer systems, the desktop surfaces associated with the disconnected physical displays are lost due to the disconnection of the physical displays, and the windows manager and/or the operating system, for example, recognizes the disconnection of the physical displays and rearranges the applications previously shown on the disconnected physical displays to be directly displayed on the remaining (connected) physical display(s). In one example of this case, the applications previously shown on disconnected physical displays are now presented as multiple two-dimensional windows on top of the existing display content of the remaining physical display(s). In order to fit into the display area of the remaining physical display(s), the display content of the disconnected physical displays, for example, may be rearranged by the windows manager and/or the operating system to be presented in distorted windows (e.g., the exact same layout of the display content of a particular application on the disconnected physical display is not kept on the new screen) or reduced windows, or may be displayed on windows that are overlapped between each other (e.g., stacked windows). Alternatively, all of the applications and other content displayed on the now-disconnected physical displays may simply be transferred to the remaining physical display(s) resulting in much less order, more clutter and overlapping windows and/or icons. In particular, some applications may crash due to the rearrangement, and certain display content, e.g., the desktop background of the desktop surfaces associated with the disconnected physical displays, may not be shown on the remaining physical display(s). In other words, the original display content of the disconnected physical displays cannot be fully and exactly preserved on the remaining physical display(s) in these computer systems due to the loss of the desktop surfaces that are associated with the disconnected physical displays.

Compositing windows managers such as, but not limited to, Compiz, Desktop Window Manger, Quartz Compositor, Metacity, and KWin, are known in the art as a component of a computer system's graphical user interface (GUI) that controls how the windows display and interact with each other, and with the rest of the desktop environment. Instead of outputting all the display content of the application to a common screen, a compositing windows manager typically outputs each application's display content first to a separate and independent buffer, or other temporary location inside the computer's memory, where they can be manipulated before they are shown. The compositing window manager then processes and combines, or composites, output from these separate buffers onto a common desktop. The result is that the display content now behaves as independent objects. However, the windows or the display content handled by the compositing windows manager are different virtual desktops of the same physical display, as opposed to different desktop surfaces associated with different physical displays. Consequently, the display content previously shown on the disconnected physical displays cannot migrate to the remaining physical display(s) by operation of the compositing windows manager.

Accordingly, there exists a need for improved method and apparatus for accommodating display migration among a plurality of physical displays in order to address one or more of the above-noted drawbacks.

BRIEF DESCRIPTION OF THE DRAWINGS

The embodiments will be more readily understood in view of the following description when accompanied by the below figures and wherein like reference numerals represent like elements, wherein:

FIG. 9 is an illustration of another example of a three-dimensional display object displayed on a first physical display;

FIG. 10 is an illustration of one example of a desktop surface shown in FIG. 9 displayed on the first physical display;

FIG. 11 is an illustration of one example of a desktop surface shown in FIG. 9 displayed on a third physical display;

DETAILED DESCRIPTION OF THE PREFERRED EMBODIMENTS

Figure 1:
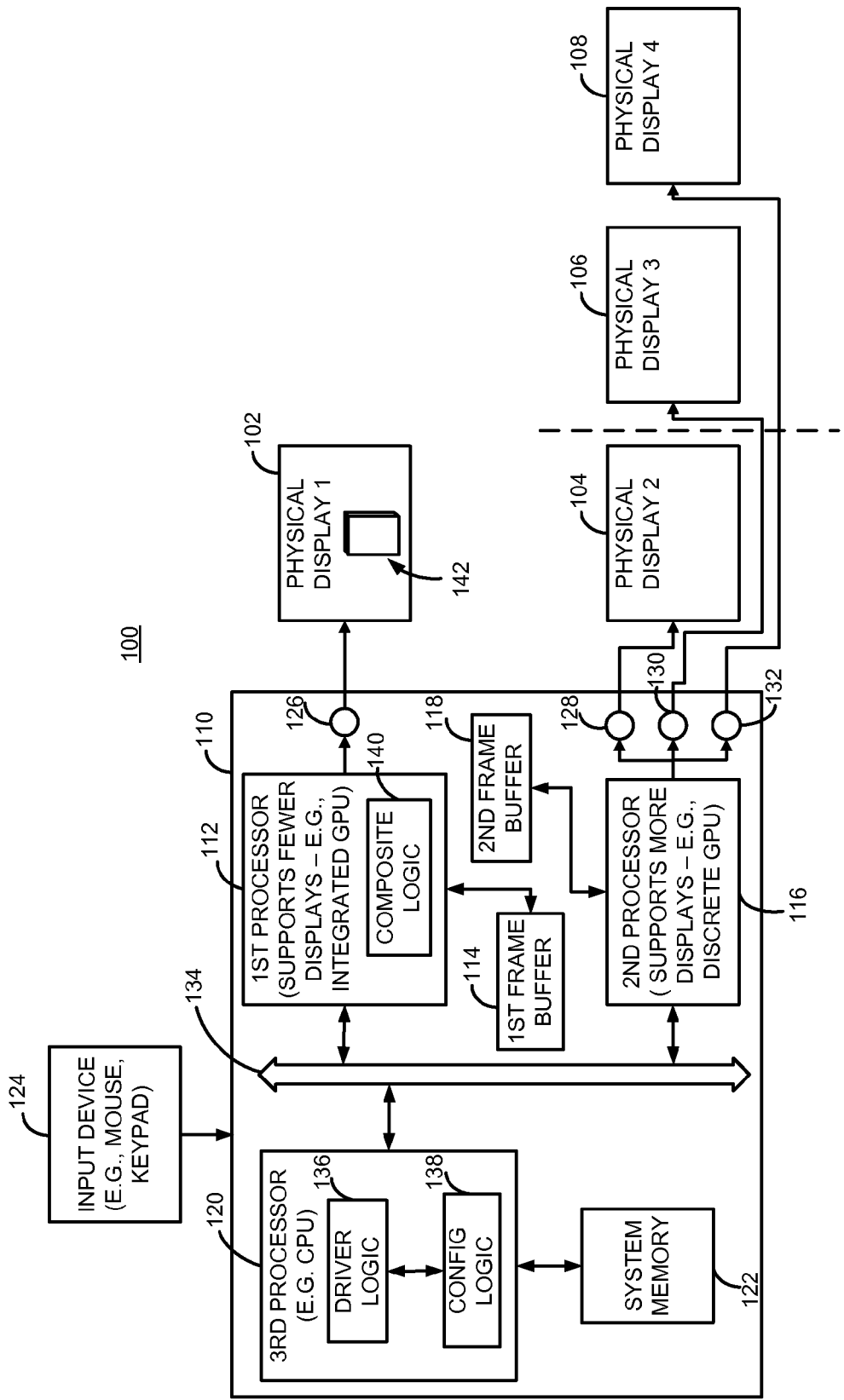
FIG. 1 is a block diagram illustrating one example of an apparatus for accommodating display migration among a plurality of physical displays in accordance with one embodiment set forth in the disclosure.

Briefly, in one example, the present disclosure provides a method and apparatus that, in response to a display migration condition such as disconnection of one or more physical displays, controls compositing of multiple desktop surfaces associated with the disconnected physical displays so as to enable access of each one of the desktop surfaces on the remaining physical display(s). As such, all the display content of any one of the disconnected physical displays can be fully preserved.

In one example, the method and apparatus for accommodating display migration among a plurality of physical displays detects a display migration condition, such as disconnecting one or more physical displays, a power supply change, a user input requesting for the display migration or any suitable condition, from at least a second physical display to a first physical display. The method and apparatus then controls compositing of a plurality of desktop surfaces so as to enable access of each one of the plurality of desktop surfaces on the first physical display. The plurality of desktop surfaces include at least a desktop surface associated with the second physical display. The desktop surface is the content in a piece of memory in a frame buffer, which represents all the display content presented on the associated physical display. In one example, the plurality of desktop surfaces may be composited into at least one three-dimensional display object. The three-dimensional display object includes but is not limited to a revolving door object or other three-dimensional shape or object (e.g., a cube object).

In one embodiment, the method and apparatus may generate at least the desktop surface associated with the second physical display, and also generate a migration result desktop surface associated with the first physical display. The migration result desktop surface includes the at least one three-dimensional display object that is composited from the plurality of desktop surfaces.

In another embodiment, the first physical display is operatively connected to at least a first processor, and the second physical display is operatively connected to at least a second processor. The method and apparatus may intercept at least a drawing command submitted to the second processor by at least one application associated with the second physical display (e.g., running on the second processor), and submit the intercepted drawing command to the first processor. The drawing command, which is intended for presenting the display content of the application on the second physical display by the second processor, is redirected to the first processor. The method and apparatus may, by the first processor, further generate at least the desktop surface associated with the second physical display based on the drawing command, and also generate a migration result desktop surface associated with the first physical display (e.g., to be displayed on the first physical display). The migration result desktop surface includes the at least one three-dimensional display object that is composited from the plurality of desktop surfaces.

In still another embodiment, the method and apparatus may detect a display migration condition from the first physical display to at least the second physical display. The display migration condition is a reverse display migration condition, such as reconnecting one or more physical displays (e.g., the second physical display) or any suitable reverse display migration condition, from the first physical display to at least the second physical display. The method and apparatus may determine at least the desktop surface associated with the second physical display from the plurality of desktop surfaces. The determined desktop surface is associated with the second physical display prior to the detection of the reverse display migration condition. The method and apparatus may also cause display of at least the determined desktop surface associated with the second physical display on the second physical display.

In yet another embodiment, the method and apparatus may cause presentation, on the first physical display, of the at least one three-dimensional display object composited from the plurality of desktop surfaces. The method and apparatus may also receive an input representing a selection of a desktop surface from the at least one three-dimensional display object presented on the first physical display. The three-dimensional display object includes the plurality of desktop surfaces on different surfaces of the three-dimensional display object. In response to the selection of the desktop surface, the method and apparatus may further cause display of the selected desktop surface on the first physical display or on a third physical display. The selected desktop surface may be displayed in a full-screen mode or any suitable mode.

Among other advantages, the method and apparatus for accommodating display migration among a plurality of physical displays provides the ability to maintain and composite desktop surfaces associated with disconnected physical displays if one or more physical displays are disconnected due to various reasons such as a reduced system power source, thereby fully preserving all the original display content that was previously displayed on the disconnected physical displays. In addition, the desktop surfaces can be composited into a display object such as a three-dimensional display object, which is presented on the remaining physical display(s) to a user, so that the user can preview each one of the desktop surfaces through the display object and select one of the preserved desktop surfaces to be displayed in a full-screen mode or any other suitable mode, thereby making it easier for the user to identify which desktop surface (i.e., the display content of the associated disconnected physical display) the user wants to switch to. Furthermore, the display migration may involve switching from multiple graphic processors to a single graphic processor and switching among multiple physical displays driven by the same graphic processor. Other advantages will be recognized by those of ordinary skill in the art.

FIG. 1 illustrates one example of a system 100 including a plurality of physical displays 102-108 (i.e., a first physical display 102, a second physical display 104, a third physical display 106, and a fourth physical display 108) and an apparatus 110 for accommodating display migration among the plurality of physical displays 102-108. The system 100 may be any suitable device, for example, a laptop computer, desktop computer, media center, handheld device (e.g., mobile or smart phone, tablet, etc.), Blu-ray™ player, gaming console, set top box or any other suitable device. In this example, the system 100 will be described as a computer system such as a desktop computer that employs the plurality of physical displays 102-108, a first processor 112 operatively connected to a first frame buffer 114, a second processor 116 operatively connected to a second frame buffer 118, and a third processor 120 operatively connected to a system memory 122. The system 100 may also include input device 124, such as a mouse, keypad, keyboard, camera, remote controller or any other suitable device, if desired, and a plurality of display connectors 126-132 (i.e., a first display connector 126, a second display connector 128, a third display connector 130, a fourth display connector 132), such as analog display connectors, for example, composite video, S-Video, VGA, digital display connectors, for example, HDMI, mini-DVI, micro-DVI, wireless connectors or any other suitable connectors. The system 100 may also include data buses or point-to-point connections that transfer data between each of its components, such as a system bus 134. Any other suitable component, such as but not limited to a storage device and a controller (not shown), may also be included in the system 100.

In one example, the first processor 112 is an integrated graphic processor that drives only the first physical display 102 through the first display connector 126, and the second processor 116 is a discrete graphic processor that drives the second, third, and fourth physical displays 104-108 through the second, third, and fourth display connectors 128-132, respectively. The first display connector 126 may be internal to the system 100 and the first physical display 102 may form a part of system 100—e.g., a display forming part of a laptop computer or mobile device such as, for example, a mobile phone. Nevertheless, it is understood that the number of the physical displays that each processor drives may be varied, and that the type of graphic processor may be varied. The third processor 120 may be a host central processing unit (CPU) bi-directionally connected to the system memory 122 and bi-directionally connected to other components of the system 100 through the system bus 134 as known in the art, or any other suitable processor. It is understood that, the first, second, and third processors 112, 116, and 120 may be integrated as a general processor (e.g., APU, accelerated processing unit; GPGPU, general-purpose computing on GPU); or the third processor (e.g., CPU) 120 may be integrated with the first processor 112 or with the second processor 116 to form a general processor. Although the first frame buffer 114, the second frame buffer 118, and the system memory 122 are shown in FIG. 1 as discrete memory devices, it is understood that a unified memory architecture that can accommodate all the processors may also be employed.

The third processor 120 may employ driver logic 136 and configuration logic 138, and the first processor 112 may employ composite logic 140. The "logic" referred to herein is defined as any suitable executing software module, hardware, executing firmware or any suitable combination thereof that can perform the desired function, such as programmed processors, discrete logic, for example, state machine, to name a few. The driver logic 136 and configuration logic 138 are operatively coupled to the third processor 120, and the composite logic 140 is operatively coupled to the first processor 112. It is understood that the driver logic 136 and configuration logic 138 may be included in the third processor 120 as a part of the third processor 120, or discrete components of the apparatus 110 and/or the system 100 that are operatively connected to the third processor 120 and can be executed by the third processor 120, such as driver software stored on computer readable medium that can be loaded into the apparatus 110. The same shall apply to the composite logic 140. The driver logic 136, configuration logic 138, and composite logic 140 are operatively and bi-directionally coupled to each other through the system bus 134 and/or other suitable communication component known in the art. As described above, the first, second, and third processors 112, 116, 120 may be integrated as a general processor (e.g., APU, accelerated processing unit; GPGPU, general-purpose computing on GPU); or the third processor (e.g., CPU) 120 may be integrated with the first processor 112 or with the second processor 116 to form a general processor. In these cases, the driver logic 136, configuration logic 138, and the composite logic 140 may be parts of the general processor or coupled to the general processor and executed by the general processor.

Figure 2:
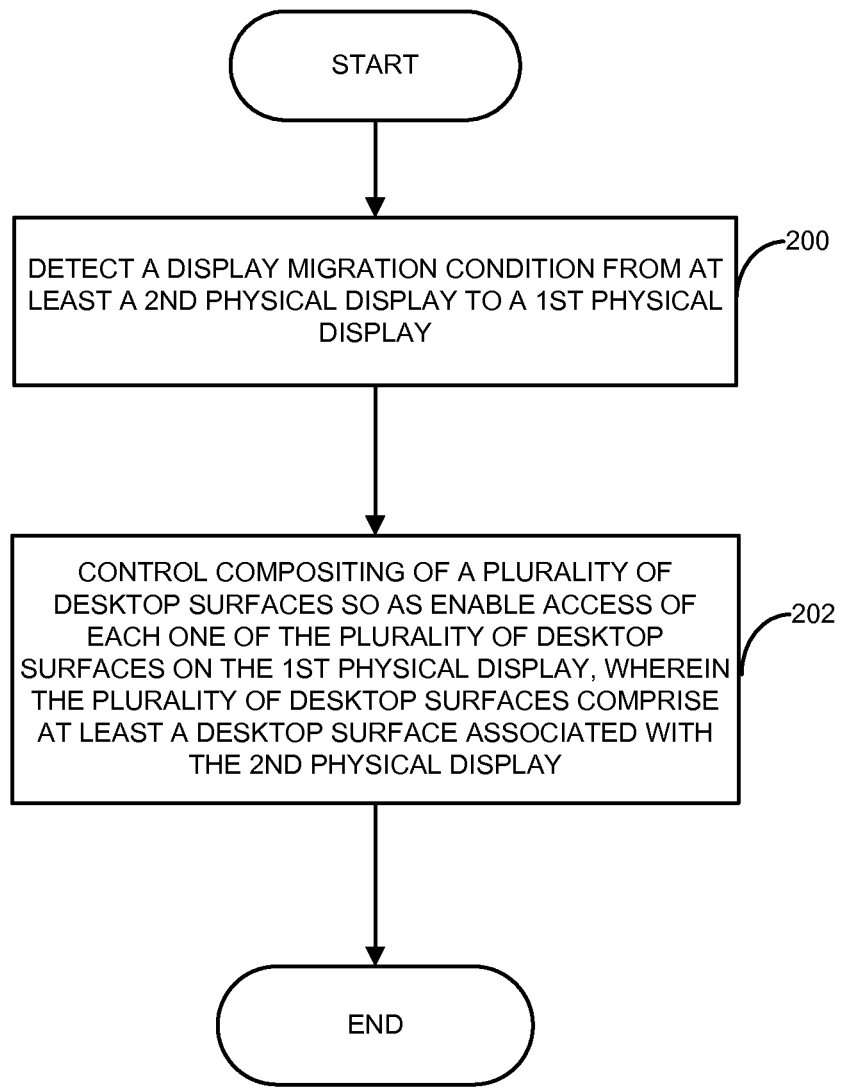
FIG. 2 is a flowchart illustrating one example of a method for accommodating display migration among a plurality of physical displays in accordance with one embodiment set forth in the disclosure.

FIG. 2 illustrates one example of a method for accommodating display migration among a plurality of physical displays according to one embodiment of the disclosure. It will be described with reference to FIG. 1. However, any suitable logic or structure may be employed. In operation, the driver logic 136, at block 200, detects a display migration condition from at least the second physical display 104 to the first physical display 102. The display migration condition may include, for example, disconnecting one or more physical displays 102-108 from the system 100, a reduced power source of the system 100 caused by switching the power source from an external AC power supply to a DC battery supply, or the like. The display migration condition may also include a user request for switching the graphic processor from the second processor 116 to the first processor 112. For ease of explaining examples, the display migration condition referred to herein is a request for migration from at least the second physical display 104 to the first physical display 102. The driver logic 136 may detect the physical migration condition by any known techniques in the art. For example, battery and AC power sources may be monitored by any suitable detector, which connects to the third processor (e.g., CPU) 120 through the system bus 134. When a power migration condition happens, CPU 120 receives the monitored condition from the detector with interrupt and then sends it to the driver logic 136 as a notification event in accordance with the advanced configuration and power interface (ACPI) specification. In another example, the driver logic 136 receives a notification of display migration from the configuration logic 138, which receives the user's interactive input indicating a display migration request via the input device 124. In still another example, the user sets a predefined condition by the configuration logic 138 to start a timer to trigger the display migration. The configuration logic 138 then sends the notification of display migration to the driver logic 136 after the predefined condition being triggered.

In response to the detection of the display migration condition from at least the second physical display 104 to the first physical display 102, at block 202, the driver logic 136 controls the composite logic 140, by sending commands to the composite logic 140, to composite (aggregate) multiple desktop surfaces so as to enable access of each one of the desktop surfaces on the first physical display 102. For example, the composite logic 140, in response to the commands received from the driver logic 136, may composite the multiple desktop surfaces into one or more display objects. The display object may be but is not limited to a two-dimensional (2D) display object or a three-dimensional (3D) display object. In a preferred example, the display object is one or more 3D display object 142. The 3D display object 142 may include any suitable object, such as but not limited to a revolving door object or other three-dimensional shape or object (e.g., a cube object), to name a few. In this example, the 3D display object 142 includes multiple desktop surfaces 504, 506, 516, 520 on different surfaces of the 3D display object 142 (also referring to FIG. 5). In particular, the 3D display object 142 includes at least a desktop surface—i.e., a second desktop surface (DS2) 504 associated with the second physical display 104 that is disconnected from the system 100. The desktop surface referred to herein is the content in a piece of memory in a frame buffer, which represents all the display content presented on the associated physical display. The desktop surfaces are displayed as the special textures of the surfaces of the 3D display object 142. In another example, multiple desktop surfaces may be mapped to the surface of multiple independent 2D display objects that are composited in a 2D view (e.g., side by side) or a 3D view (e.g., stacked in 3D).

In one example embodiment set forth in the disclosure, at least the second desktop surface 504 associated with the second physical display 104 and a first desktop surface (DS1) 506 associated with the first physical display 102 are composited at block 202 using the composite logic 140 controlled by the driver logic 136. The block 202 is further illustrated in FIGS. 3 and 5.

Figure 3:
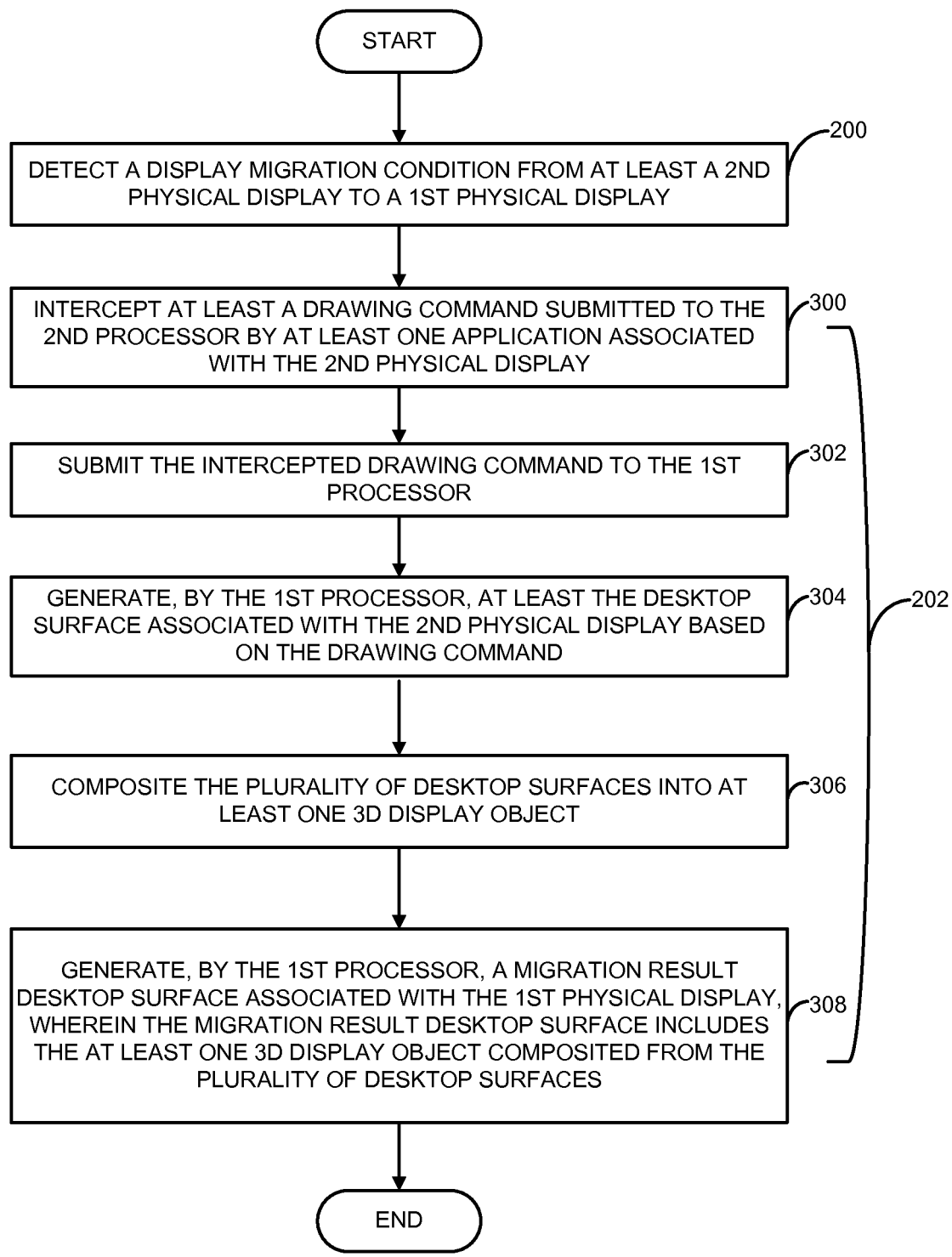
FIG. 3 is a flowchart illustrating another example of a method for accommodating display migration among a plurality of physical displays.
Figure 5:
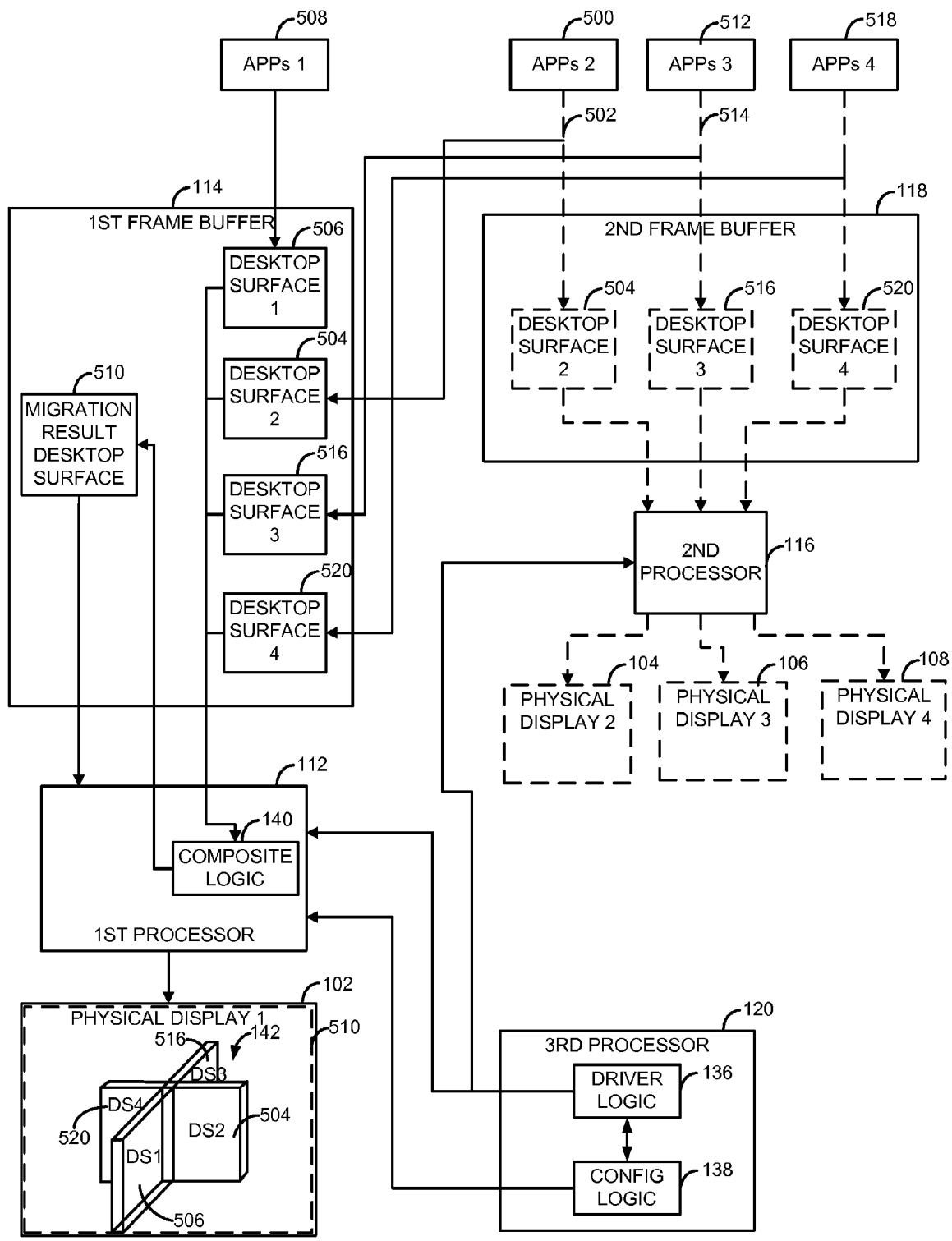
FIG. 5 is a block diagram illustrating the apparatus for accommodating display migration among a plurality of physical displays shown in FIG. 1.

Referring to FIGS. 3 and 5, in response to the detection of the display migration condition at block 200, the driver logic 136, at block 300, intercepts at least a drawing command 502 submitted to the second processor 116 by at least one application 500 associated with the second physical display 104. As noted above, for ease of explaining examples, only the second physical display 104 is discussed in this example. As shown in FIG. 5, the applications 500 associated with the second physical display 104 may be any software program that runs on the system 100 and has its display content presented on the second physical display 104. The application may be a user application or any program that has its own display content presented on the associated physical display. In one example, one of the applications 500 may be a photo display software, and its display content is a window of a photo presented on the second physical display 104. In another example, one of the applications 500 may be a program that presents the desktop background on the second physical display 104. Prior to the detection of the display migration condition at block 200, each one of the applications 500 sends a drawing command 502 to the second processor 116 to draw, in the second frame buffer 118, a desktop surface 504 that includes all the display content corresponding to all the applications 500 intended for displaying on the second physical display 104. The second processor 116 displays the desktop surface 504 on the second physical display 104.

In response to the detection of the display migration condition, at block 300, the driver logic 136 intercepts the drawing commands 502, and submits the intercepted drawing commands 502 to the first processor 112 at block 302. The drawing command 502, which is intended for presenting the display content of the application 500 on the second physical display 104 by the second processor 116, is redirected to the first processor 112. Preferably, all the drawing commands 502 associated with the second physical display 104 are redirected to the first processor 112 for the purpose of persevering all the display content of the disconnected second physical display 104.

At block 304, the driver logic 136 controls the first processor 112 to generate the second desktop surface 504 associated with the second physical display 104 in the first frame buffer 114. In other words, the original display content of the second physical display 104 is remapped to the first frame buffer 114. In this example embodiment, the first processor 112 also generates the first desktop surface 506 associated with the first physical display 102. The first desktop surface 506 includes all the display content of all the applications 508 associated with the first physical display 102.

At block 306, the composite logic 140, operatively coupled to the first processor 112, composites at least the first and second desktop surfaces 506, 504 in the first frame buffer 114, for example, into one or more display objects such as the 3D display object 142. The compositing can be performed by any known techniques. For example, a 3D wire frame model may be built by the first processor 112, and the 3D rendering process is performed to expose and allocate the desktop surfaces 504, 506 stored in the first frame buffer 114 as the special texture onto the 3D wire frame model. Additional 3D rendering processes such as reflection, shading, transport and projection may also be performed to generate the 3D display object 142. As noted above, although it is preferable to composite at least the first and second desktop surfaces 506, 504 into one or more 3D display object, the first and second desktop surfaces 506, 504 may be mapped to the surface of multiple independent 2D display objects. The multiple independent 2D display objects may be composited into a 2D or 3D wire frame model as special textures.

Further, at block 308, the driver logic 136 controls the first processor 112 to generate a migration result desktop surface 510 associated with the first physical display 102 in the first frame buffer 114. The migration result desktop surface 510 includes the 3D display object 142 composited at block 306. Optionally, the migration result desktop surface 510 may also include the first desktop surface 506 arranged underneath the 3D display object 142 as a background. In other examples, the migration result desktop surface 510 may not include the first desktop surface 506 as the background, but instead, include any other background chosen by the user or no background at all.

In another example embodiment set forth in the disclosure, in addition to the second physical display 104, the third physical display 106 is also disconnected and thus, the display content of the third physical display 106 also needs to be preserved. Accordingly, at least the second desktop surface 504 associated with the second physical display 104 and a third desktop surface (DS3) 516 associated with the third physical display 106 are composited at block 202 using the composite logic 140 controlled by the driver logic 136. As opposed to the previous example embodiment, it is not necessary to composite the first desktop surface 506 associated with the first physical display 102 in this example embodiment.

At block 200, the driver logic 136 detects a display migration condition from at least the second and third physical displays 104, 106 to the first physical display 102. In this example embodiment, the driver logic 136 then, at block 202, controls the composite logic 140, by sending commands to the composite logic 140, to composite at least the second and third desktop surfaces 504, 516 so as to enable access of at least the second and third desktop surfaces 504, 516 on the first physical display 102.

Referring to FIGS. 3 and 5, at block 300, the driver logic 136 intercepts at least the drawing commands 502, 514 submitted to the second processor 116 by at least the applications 500, 512 associated with the second and third physical displays 104, 106, respectively. In this example embodiment, in additional to the drawing commands 502 submitted by the application 500 associated with the second physical displays 104, the drawings commands 514 submitted by the applications 512 associated with the third physical display 106 are also intercepted by the driver logic 136, and are further submitted to the first processor 112 at block 302. At block 304, the driver logic 136 then controls the first processor 112 to generate at least the second and third desktop surfaces 504, 516 in the first frame buffer 114 based on the drawing commands 502, 514. For example, as shown in FIG. 5, in additional to generating the second desktop surface 504, the first processor 112 also generates the third desktop surface 516 having all the display content of the third physical display 106. At block 306, the composite logic 140 composites at least the second and third desktop surfaces 504, 516, for example, into the 3D display object 142. As shown in FIG. 5, if the fourth physical display 108 is also disconnected from the system 100, a fourth desktop surface (DS4) 520 including all the display content of the applications 518 associated with the fourth physical display 108 may be composited into the 3D display object 142 as well. For ease of explaining examples, only the second and third physical displays 104, 106 are discussed in this example embodiment. The driver logic 136, at block 308, causes the first processor 112 to generate the migration result desktop surface 510 associated with the first physical display 102. In this example, the migration result desktop surface 510 in this example embodiment includes the 3D display object 142 that includes at least the second and third desktop surfaces 504, 516 but does not include the first desktop surface 506.

Figure 4:
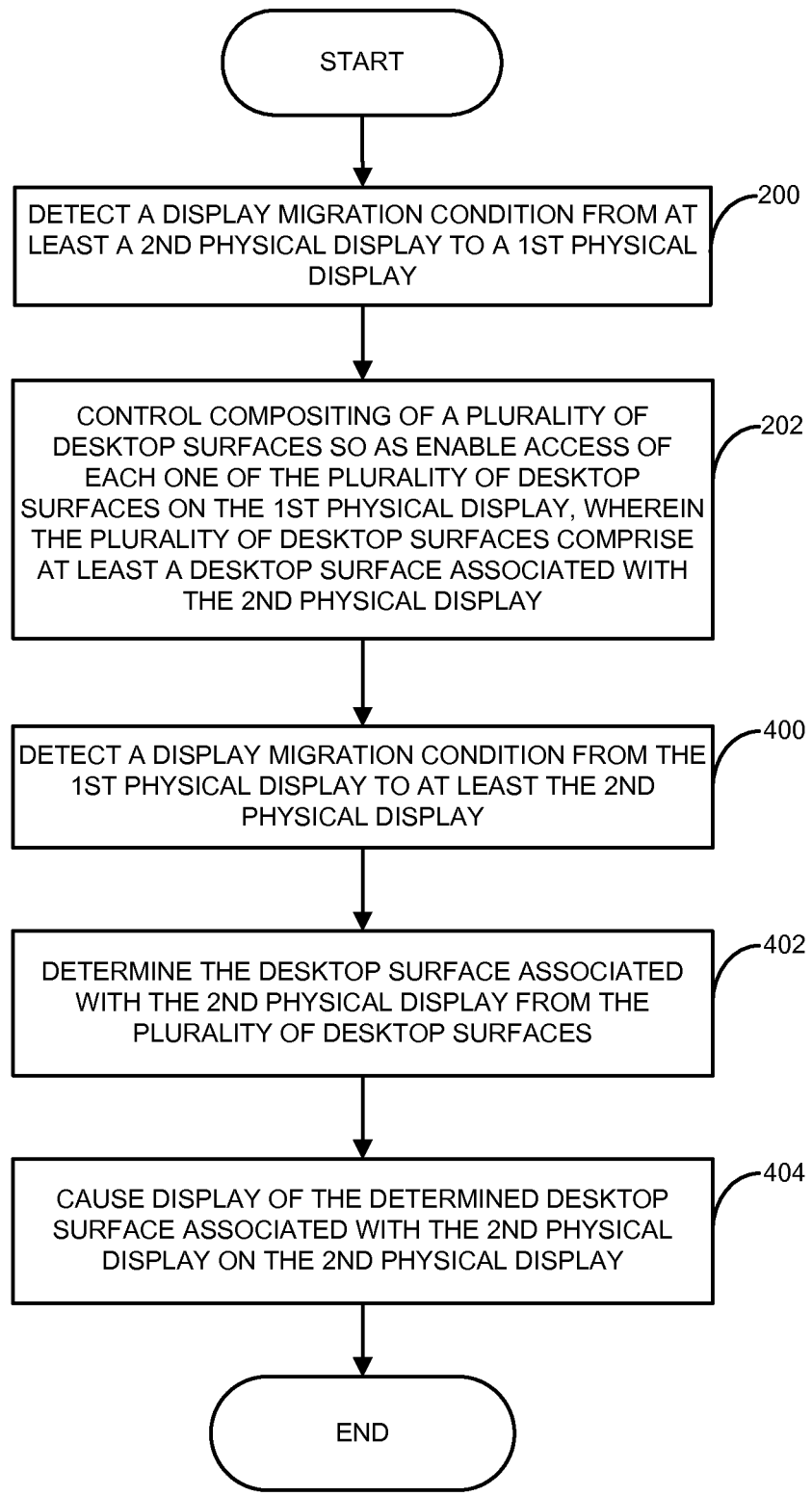
FIG. 4 is a flowchart illustrating yet another example of a method for accommodating display migration among a plurality of physical displays.

FIG. 4 illustrates another example of a method for accommodating display migration among a plurality of physical displays according to one embodiment of the disclosure. In this example, one or more previously disconnected physical displays are reconnected to the system 100, and the corresponding desktop surfaces are displayed on the reconnected physical displays to restore the display content onto the corresponding physical displays.

At block 400, the driver logic 136 detects a display migration condition from the first physical display 102 to at least the second physical display 104. The display migration condition is a reverse condition of the previous display migration condition in block 200, such as reconnecting one or more previously disconnected physical displays 102-108 back to the system 100. The driver logic 136 may detect the reverse display migration condition by the same known techniques described previously. For example, when a reverse power migration condition happens, CPU 120 receives the monitored condition from the detector with interrupt and then sends it to the driver logic 136 as a notification event in accordance with the ACPI specification. In this example, since at least the second physical display 104 has been disconnected from the system 100, and the second desktop surface 504 associated with the second physical display 104 has been composited with other desktop surfaces, the reverse display migration condition may be reconnecting the second physical display 104 to the system 100.

At block 402, in response to the detection of the reverse display migration condition, the driver logic 136 determines the desktop surface—i.e., in this example, the second desktop surface 504 associated with the second physical display 104, from the composited multiple desktop surface 504, 506, 516, 520. It is noted at block 202, the driver logic 136 also tracks and saves all the association information between each generated desktop surface and its corresponding physical display using any suitable technique known in the art. For example, such association may be carried out through the establishment of a logical link by the driver logic 136, such as a pointer, between the generated desktop surface and the corresponding physical display. The desktop surface—physical display association information may be saved as a log file in the system memory 122 or a storage device operatively coupled to CPU 120. Accordingly, at block 402, the driver logic 136 can determine which desktop surface should be restored by matching the detected reverse display migration condition with the saved desktop surface—physical display association information. In this example, the second desktop surface 504 is determined by the driver logic 136 as the desktop surface that is previously associated with the reconnected second physical display 104.

At block 404, in response to the determination of the desktop surface associated with the reconnected physical display, which is the second desktop surface 504 in this example, the driver logic 136 causes the first processor 112 to display the determined desktop surface on the reconnected physical display. In this example, the second desktop surface 504 is displayed on the reconnected second physical display 104. As such, all the display content of the disconnected second physical display 104 is preserved and migrated back onto the reconnected second physical display 104. It is understood that the method and apparatus may restore more than one desktop surface in response to a reverse display migration condition that involves more than one reconnected physical display of the system 100.

Figure 6:
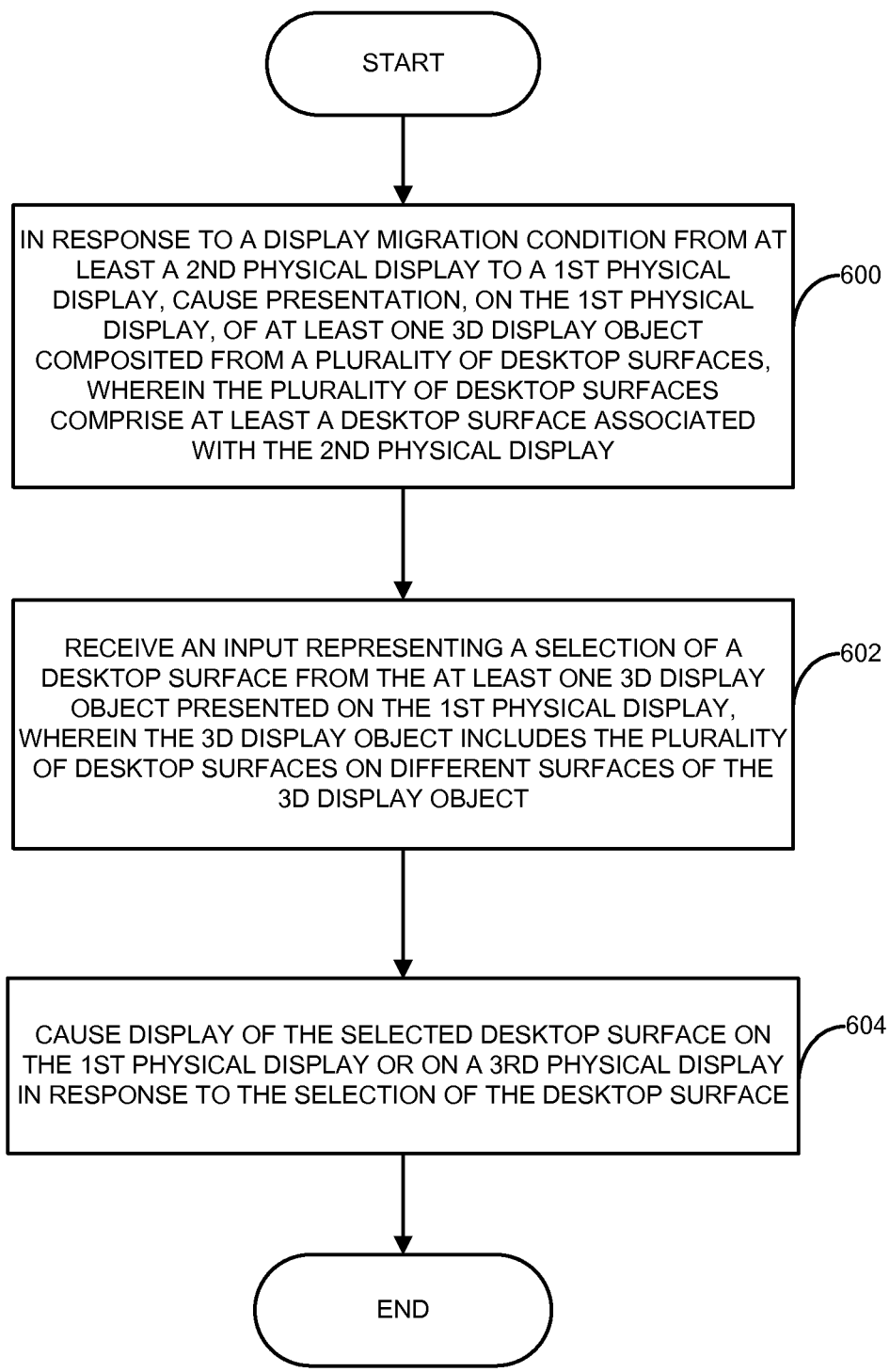
FIG. 6 is a flowchart illustrating one example of a method for accommodating display migration among a plurality of physical displays in accordance with one embodiment set forth in the disclosure.
Figure 7:
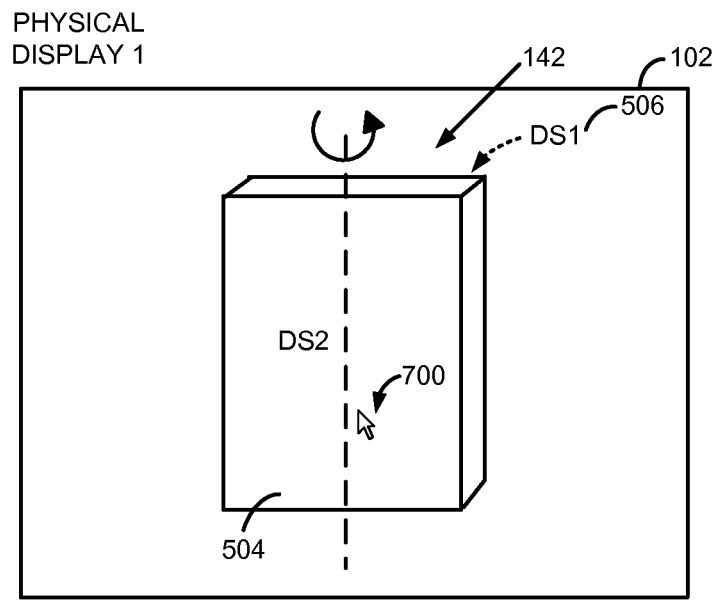
FIG. 7 is an illustration of one example of a three-dimensional display object displayed on a first physical display.

FIGS. 6-11 illustrate another example of a method for accommodating display migration among a plurality of physical displays according to one embodiment of the disclosure. Referring to FIG. 6, at block 600, in response to the display migration condition, the driver logic 136 causes the first process 112 to present at least one 3D display object 142 on the first physical display 102. As described above, the 3D display object 142 may be composited from multiple desktop surfaces including at least the second desktop surface 504 associated with the second physical display 104 by the composite logic 140. As shown in FIG. 7, in this example, the 3D display object 142 is a revolving door object. The first desktop surface 506 and the second desktop surface 504 are displayed as special textures on two surfaces of the 3D display object 142. Although only one 3D display object 142 is shown in FIG. 7, multiple 3D display objects may be composited and presented on the first physical display 102 if desired. The 3D display object 142 may rotate around a rotating axis at a certain speed, so that the user can see the two desktop surfaces 504, 506. The rotating axis and speed may be configured by the configuration logic 138. The rotating axis and speed, for example, may be adjusted by the user input from the input device 124, or may be pre-defined by the user or the system 100 by the configuration logic 138. As such, the user can preview the entire content of any one of the desktop surfaces by rotating the 3D display object 142.

Figure 8:
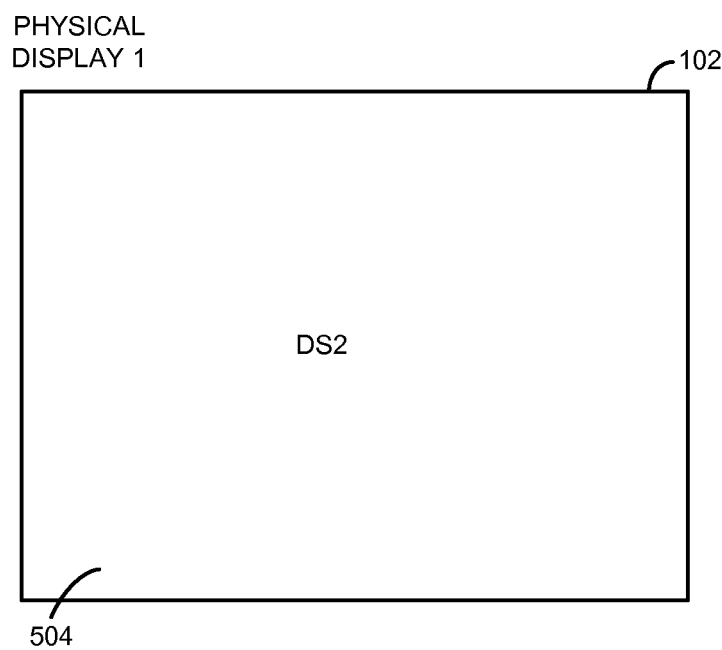
FIG. 8 is an illustration of one example of a desktop surface shown in FIG. 7 displayed on the first physical display.

Referring back to FIG. 6, at block 602, the configuration logic 138 receives an input representing a selection of a desktop surface from the 3D display object 142 presented on the first physical display 102. The configuration logic 138 may, for example, receive a user input indicating the selection of the desktop surface by the input device 124, such as a mouse. The configuration logic 138 may also pre-define a rule of selecting the desktop surface without the user input. In this example, also referring to FIG. 7, the user selects the second desktop surface 504 from the 3D display object 142 by a mouse cursor 700. In operation, at block 604, in response to the selection, the driver logic 136 causes the first processor 112 to display the selected second desktop surface 504 on the first physical display 102. As shown in FIG. 8, preferably, the selected second desktop surface 504 is displayed on the first physical display 102 in a full-screen mode. It is understood that the selected second desktop surface 504 may also be displayed on the first physical display 102 in any other suitable mode. For example, the user may, by the configuration logic 138, control the size of the selected desktop surface to be displayed.

As shown in FIG. 9, in another example, the migration result desktop surface 510 includes the 3D display object 142 such as a revolving door object, and the first desktop surface 506 as the background. Similar to the revolving door object shown in FIG. 7, the revolving door object 142 in this example also rotates around a rotating axis at a certain speed. The rotating axis and speed may be adjusted by the configuration logic 138. In this example, the revolving door object shown in FIG. 9 is composited from multiple desktop surfaces 504, 516, 520 associated with the second, third, and fourth physical displays 104-108. The first desktop surface 506 associated with the first physical display 102, however, is not necessary to be composited into the revolving door object 142 in this example. In operation, at block 602, the configuration logic 138 may receive an input representing the selection of a desktop surface from the 3D display object 142. For example, in FIG. 9, the second desktop surface 504 associated with the second physical display 104 is selected using the mouse cursor 700.

At block 604, in response to the selection, in one example as shown in FIG. 10, the selected second desktop surface 504 may be displayed on the first physical display 102 in a full-screen mode or any suitable mode. In this example, the selected second desktop surface 504 is displayed on the same physical display that presenting the 3D display object 142. In another example shown in FIG. 11, the selected second desktop surface 504 may be displayed on a third physical display instead of the first physical display 102. It is noted that, if the third physical display 106 is not disconnected from the system 100, the "third physical display" referred to herein may be the same third physical display 106 shown in other figures. Otherwise, the "third physical display" referred to herein indicates that the preserved display content may be displayed on any one of the remaining physical displays that does not present the 3D display object 142. In other words, the first physical display 102 in this example may only be used to present the 3D display object 142, while the selected second desktop surface 504 can be displayed on any remaining physical display determined by the user input or a pre-defined rule by the configuration logic 138.

Figure 12:
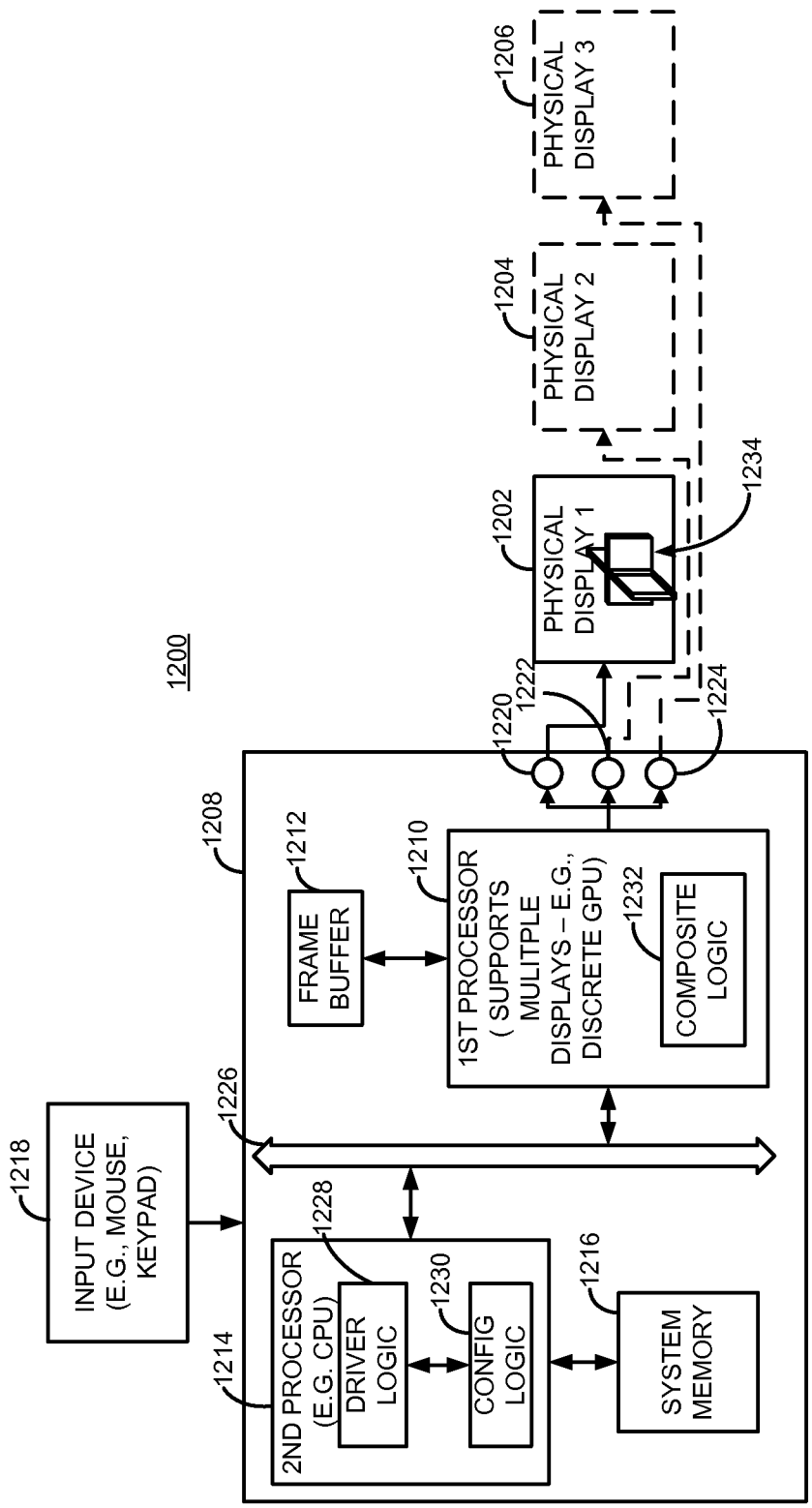
FIG. 12 is a block diagram illustrating one example of an apparatus for accommodating display migration among a plurality of physical displays in accordance with one embodiment set forth in the disclosure.

FIG. 12 illustrates one example of a system 1200 having a plurality of physical displays 1202-1206 and an apparatus 1208 for accommodating display migration among the plurality of physical displays 1202-1206 in accordance with another embodiment of the disclosure. The system 1200 may be any suitable device, for example, a laptop computer, desktop computer, media center, handheld device (e.g., mobile or smart phone, tablet, etc.), Blu-ray™ player, gaming console, set top box or any other suitable device. In this example, the system 1200 will be described as a computer system such as a laptop computer that employs the plurality of physical displays 1202-1206, a first processor 1210 operatively connected to a frame buffer 1212, and a second processor 1214 operatively connected to a system memory 1216. It is noted that, instead of having two processors each drives one or multiple physical displays in another embodiment of the present disclosure shown in FIG. 1, only one processor 1210 that drives multiple physical displays 1202-1206 is employed by the system 1200 in this example. The system 1200 may also include input device 1218, such as a mouse, keypad, keyboard, camera, remote controller or any other suitable device, if desired, and a plurality of display connectors 1220-1224 (i.e., a first display connector 1220, a second display connector 1222, and a third display connector 1224). The system 1200 may also include data buses or point-to-point connections that transfer data between each of its components, such as a system bus 1226. Any other suitable component, such as, but not limited to, a storage device or a controller (not shown), may also be included in the system 1200.

In one example, the first processor 1210 may be a discrete graphic processor or an integrated graphic processor that drives the first, second, and third displays 1202-1206 through the first, second, and third display connectors 1220-1224, respectively. The first display connector 1220 may be internal to the system 1200 and the first physical display 1202 may form a part of system 1200—e.g., a display forming part of a laptop computer or mobile device such as, for example, a mobile phone. Nevertheless, it is understood that the number of the physical displays that the first processor 1210 drives may be varied. The second processor 1214 may be a host CPU bi-directionally connected to the system memory 1216 and bi-directionally connected to other components of the system 1200 through the system bus 1226. The first and second processors 1212, 1214 may be integrated into a general processor (e.g., APU, accelerated processing unit; GPGPU, general-purpose computing on GPU) that performs all the functions of the first and second processors 1212, 1214. Although the frame buffer 1212 and the system memory 1216 are shown in FIG. 12 as discrete memory devices, it is understood that a unified memory architecture that can accommodate the two processors 1210, 1214 may also be employed.

The second processor 1214 may employ or include driver logic 1228 and configuration logic 1230, and the first processor 1210 may employ or include composite logic 1232. The driver logic 1228, configuration 1230, and composite logic 1232 are operatively and bi-directionally coupled to each other through the system bus 1226 or other suitable communication component known in the art. As described above, the first and second processors 1212, 1214 may be integrated into a general processor (e.g., APU, accelerated processing unit; GPGPU, general-purpose computing on GPU) that performs all the functions of the first and second processors 1212, 1214. In that case, the driver logic 1228, configuration logic 1230, and composite logic 1232 may be parts of the general processor or coupled to the general processor and executed by the general processor.

Figure 13:
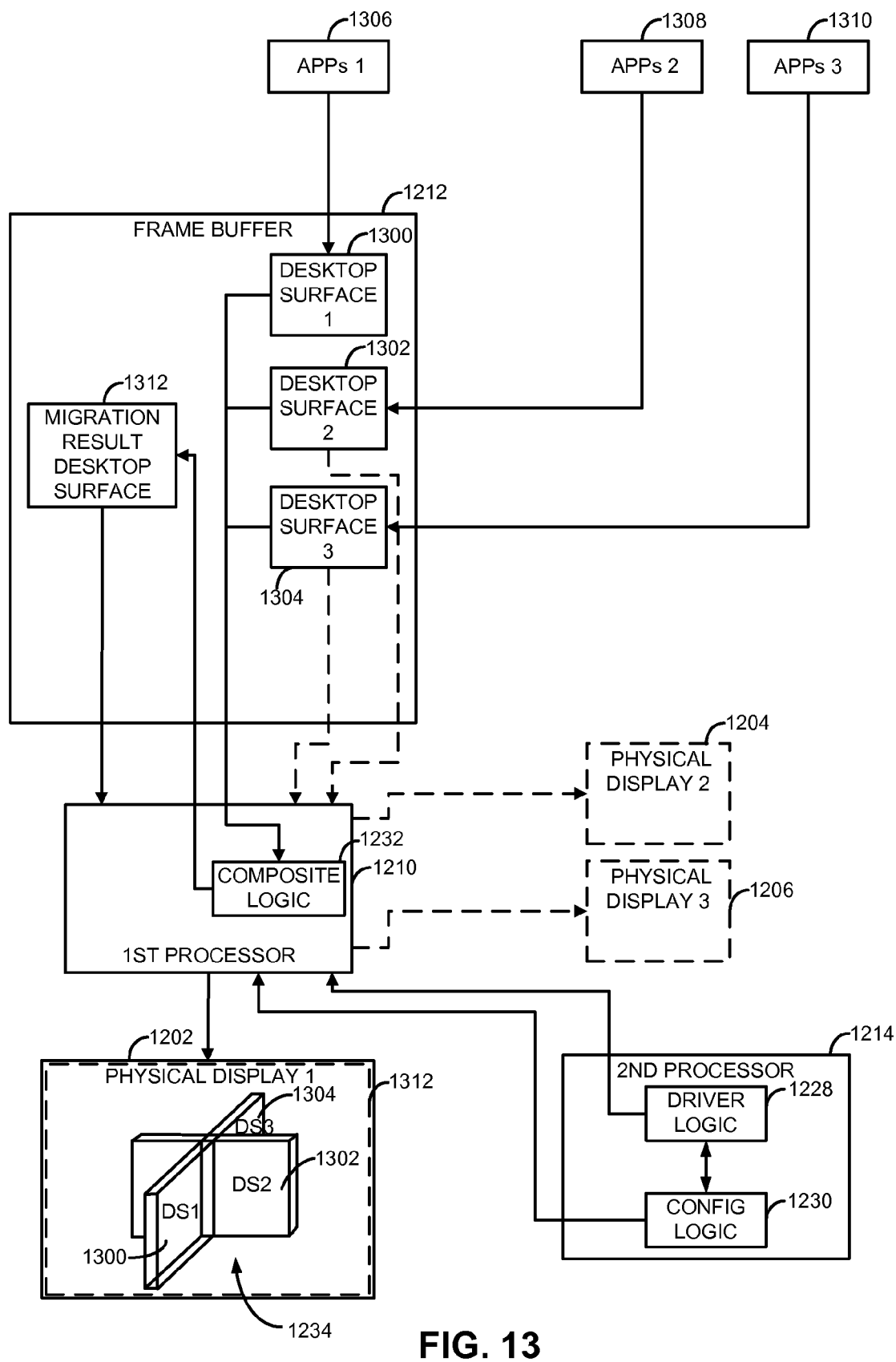
FIG. 13 is a block diagram illustrating the apparatus for accommodating display migration among a plurality of physical displays shown in FIG. 12.

The system 1200 may apply the similar method shown in FIG. 2 to accommodate display migration among the plurality of physical displays 1202-1206 in response to the detection of a display migration condition. Referring to FIGS. 2, 12, and 13, at block 200, a display migration condition such as disconnecting one or more physical displays 1202-1206 from the system 1200, a reduced power source of the system 1200 caused by switching the power source from an external AC power supply to a DC battery supply, or the like, is detected by the driver logic 1228. At block 202, the driver logic 1228 controls the composite logic 1232, by sending commands to the composite logic 1232, to composite multiple desktop surfaces 1300-1304 (i.e., the first desktop surface 1300 associated with the first physical display 1202, the second desktop surface 1302 associated with the second physical display 1204, the third desktop surface 1304 associated with the third physical display 1206). To composite the multiple desktop surfaces 1300-1304, the driver logic 1228 may control the first processor 1210 to generate, in the frame buffer 1212, the first, second, and third desktop surfaces 1300-1304 having the display content of the applications 1306-1310 associated with the first, second, and third physical displays 1202-1206, respectively. In one example, the composite logic 1232 composites the first, second, and third desktop surfaces 1300-1304 into a 3D display object 1234 using any known techniques such as 3D rendering. The driver logic 1228 then controls the first processor 1210 to generate a migration result desktop surface 1312 including at least the 3D display object 1234. The 3D display object 1234 is displayed on the remaining first physical display 1202. Eventually, one of the desktop surfaces 1300-1304 may be selected by the configuration logic 1230 based on the user input from the input device 1218 or a pre-defined rule, and is displayed in a full-screen mode or other suitable mode on the first physical display 1202. It is understood that if there are more than one physical display remaining after the display migration, the selected desktop surface may be display on a physical display other than the first physical display 1202.

Also, the driver logic, configuration logic, and composite logic described herein may be implemented as driver software stored on a computer readable medium such as but not limited to CDROM, RAM, other forms of ROM, hard drives, distributed memory, etc., in combination with processors. As such, driver software may be stored on computer readable medium. The computer readable medium stores instructions executable by one or more processors that causes the one or more processors to perform operations described herein.

Among other advantages, the method and apparatus for accommodating display migration among a plurality of physical displays provides the ability to maintain and composite desktop surfaces associated with disconnected physical display if one or more physical displays are disconnected due to various reasons such as a reduced system power source, thereby fully preserving all the original display content that was previously displayed on the disconnected physical displays. In addition, the desktop surfaces can be composited into a display object such as a three-dimensional display object, which is presented on the remaining physical display(s) to a user, so that the user can preview each one of the desktop surfaces through the display object and select one of the preserved desktop surfaces to be displayed in a full-screen mode or any other suitable mode, thereby making it easier for the user to identify which desktop surface (i.e., the display content of the associated disconnected physical display) the user wants to switch to. Furthermore, the display migration may involve switching from multiple graphic processors to a single graphic processor and switching among multiple physical displays driven by the same graphic processor. Other advantages will be recognized by those of ordinary skill in the art.

The above detailed description of the invention and the examples described therein have been presented for the purposes of illustration and description only and not by limitation. It is therefore contemplated that the present invention cover any and all modifications, variations or equivalents that fall within the spirit and scope of the basic underlying principles disclosed above and claimed herein.

What is claimed is:

1. A method for accommodating display migration among a plurality of physical displays, the method comprising:
   detecting a display migration condition from at least a second physical display to a first physical display; and
   controlling compositing of a plurality of desktop surfaces by combining the plurality of desktop surfaces into a display object that includes the plurality of desktop surfaces on different surfaces of the display object in response to detecting the display migration condition from the at least the second physical display to the first physical display, so as to enable access to each one of the plurality of desktop surfaces of the display object on the first physical display, wherein the plurality of desktop surfaces comprise at least a desktop surface associated with the second physical display.

2. The method of claim 1, wherein the plurality of desktop surfaces are composited into a three-dimensional display object.

3. The method of claim 2, wherein controlling compositing comprises:
   generating at least the desktop surface associated with the second physical display; and
   generating a migration result desktop surface associated with the first physical display, wherein the migration result desktop surface includes the three-dimensional display object composited from the plurality of desktop surfaces.

4. The method of claim 2, wherein the first physical display is operatively connected to at least a first processor and the second physical display is operatively connected to at least a second processor; and wherein controlling compositing comprises:
   intercepting at least a drawing command submitted to the second processor by at least one application associated with the second physical display; and
   submitting the intercepted drawing command to the first processor.

5. The method of claim 4, wherein controlling compositing further comprises:
   generating, by the first processor, at least the desktop surface associated with the second physical display based on the drawing command; and
   generating, by the first processor, a migration result desktop surface associated with the first physical display, wherein the migration result desktop surface includes the three-dimensional display object composited from the plurality of desktop surfaces.

6. The method of claim 2 further comprising:
   causing presentation, on the first physical display, of the three-dimensional display object composited from the plurality of desktop surfaces;
   receiving an input representing a selection of a desktop surface from the three-dimensional display object presented on the first physical display; and
   causing display of the selected desktop surface on the first physical display or on a third physical display in response to the selection of the desktop surface.

7. The method of claim 1 further comprising:
   detecting a display migration condition from the first physical display to at least the second physical display;
   determining at least the desktop surface associated with the second physical display from the plurality of desktop surfaces; and
   causing display of at least the determined desktop surface associated with the second physical display on the second physical display.

8. An apparatus comprising:
   driver logic, comprising one or more processors, operative to:
      detect a display migration condition from at least a second physical display to a first physical display; and
      control compositing of a plurality of desktop surfaces by combining the plurality of desktop surfaces into a display object that includes the plurality of desktop surfaces on different surfaces of the display object in response to detecting the display migration condition from the at least the second physical display to the first physical display, so as to enable access to each one of the plurality of desktop surfaces of the display object on the first physical display, wherein the plurality of desktop surfaces comprise at least a desktop surface associated with the second physical display.

9. The apparatus of claim 8 further comprising composite logic operative to composite the plurality of desktop surfaces into a three-dimensional display object.

10. The apparatus of claim 9, wherein the driver logic is further operative to:
control generation of at least the desktop surface associated with the second physical display; and
control generation of a migration result desktop surface associated with the first physical display, wherein the migration result desktop surface includes the three-dimensional display object composited from the plurality of desktop surfaces.

11. The apparatus of claim 9 further comprising a first processor including the composite logic, a second processor, and a third processor including the driver logic, wherein the first physical display is operatively connected to at least the first processor and the second physical display is operatively connected to at least the second processor; and wherein the driver logic is further operative to:
intercept at least a drawing command submitted to the second processor by at least one application associated with the second physical display; and
submit the intercepted drawing command to the first processor.

12. The apparatus of claim 11, wherein the driver logic is further operative to:
control generation, by the first processor, of at least the desktop surface associated with the second physical display based on the drawing command; and
control generation, by the first processor, of a migration result desktop surface associated with the first physical display, wherein the migration result desktop surface includes the three-dimensional display object composited from the plurality of desktop surfaces.

13. The apparatus of claim 9, wherein the driver logic is further operative to:
cause presentation, on the first physical display, of the three-dimensional display object composited from the plurality of desktop surfaces; and
in response to a selection of a desktop surface from the three-dimensional display object presented on the first physical display, cause display of the selected desktop surface on the first physical display or on a third physical display; and
wherein the apparatus further comprises configuration logic operative to receive an input representing the selection of the desktop surface from the three-dimensional display object presented on the first physical display.

14. The apparatus of claim 8, wherein the driver logic is further operative to:
detect a display migration condition from the first physical display to at least the second physical display;
determine at least the desktop surface associated with the second physical display from the plurality of desktop surfaces; and
cause display of at least the determined desktop surface associated with the second physical display on the second physical display.

15. A method for accommodating display migration among a plurality of physical displays, the method comprising:
in response to a display migration condition from at least a second physical display to a first physical display, causing presentation, on the first physical display, of a three-dimensional display object composited from a plurality of desktop surfaces, wherein the plurality of desktop surfaces comprise at least a desktop surface displayed on the second physical display before the display migration condition and displayed as a desktop surface of the three-dimensional display object on the first physical display in response to the display migration condition;
receiving an input representing a selection of a desktop surface from the three-dimensional display object presented on the first physical display, wherein the three-dimensional display object includes the plurality of desktop surfaces on different surfaces of the three-dimensional display object; and
causing display of the selected desktop surface on the first physical display or on a third physical display in response to the selection of the desktop surface.

16. The method of claim 15, wherein the selected desktop surface is displayed in a full-screen mode.

17. The method of claim 15, wherein the three-dimensional display object includes a revolving door object.

18. An apparatus comprising:
driver logic, comprising one or more processors, operative to:
in response to a display migration condition from at least a second physical display to a first physical display, cause presentation, on the first physical display, of a three-dimensional display object composited from a plurality of desktop surfaces, wherein the plurality of desktop surfaces comprise at least a desktop surface displayed on the second physical display before the display migration condition and displayed as a desktop surface of the three-dimensional display object on the first physical display in response to the display migration condition; and
in response to a selection of a desktop surface from the three-dimensional display object presented on the first physical display, cause display of the selected desktop surface on the first physical display or on a third physical display; and
configuration logic operative to receive an input representing the selection of the desktop surface from the three-dimensional display object presented on the first physical display, wherein the three-dimensional display object includes the plurality of desktop surfaces on different surfaces of the three-dimensional display object.

19. The apparatus of claim 18, wherein the selected desktop surface is displayed in a full-screen mode.

20. The apparatus of claim 18, wherein the three-dimensional display object includes a revolving door object.

21. A tangible, non-transitory computer readable storage medium comprising executable instructions that when executed by one or more processors causes the one or more processors to:
detect a display migration condition from at least a second physical display to a first physical display; and
control compositing of a plurality of desktop surfaces by combining the plurality of desktop surfaces into a display object that includes the plurality of desktop surfaces on different surfaces of the display object in response to detecting the display migration condition from the at least the second physical display to the first physical display, so as to enable access to each one of the plurality of desktop surfaces of the display object on the first physical display, wherein the plurality of desktop surfaces comprise at least a desktop surface associated with the second physical display.

22. The computer readable storage medium of claim 21, wherein the plurality of desktop surfaces are composited into a three-dimensional display object.

23. The computer readable storage medium of claim 22 further comprising executable instructions that when executed by one or more processors causes the one or more processors to:

generate at least the desktop surface associated with the second physical display; and generate a migration result desktop surface associated with the first physical display, wherein the migration result desktop surface includes the three-dimensional display object composited from the plurality of desktop surfaces.

24. The computer readable storage medium of claim 22, wherein the first physical display is operatively connected to at least a first processor and the second physical display is operatively connected to at least a second processor, the computer readable storage medium further comprising executable instructions that when executed by one or more processors causes the one or more processors to:

intercept at least a drawing command submitted to the second processor by at least one application associated with the second physical display; and submit the intercepted drawing command to the first processor.

25. The computer readable storage medium of claim 24 further comprising executable instructions that when executed by one or more processors causes the one or more processors to:

generate, by the first processor, at least the desktop surface associated with the second physical display based on the drawing command; and generate, by the first processor, a migration result desktop surface associated with the first physical display, wherein the migration result desktop surface includes the three-dimensional display object composited from the plurality of desktop surfaces.

26. The computer readable storage medium of claim 22 further comprising executable instructions that when executed by one or more processors causes the one or more processors to:

cause presentation, on the first physical display, of the three-dimensional display object composited from the plurality of desktop surfaces;

receive an input representing a selection of a desktop surface from the three-dimensional display object presented on the first physical display; and cause display of the selected desktop surface on the first physical display or on a third physical display in response to the selection of the desktop surface.

27. The computer readable storage medium of claim 21 further comprising executable instructions that when executed by one or more processors causes the one or more processors to:

detect a display migration condition from the first physical display to at least the second physical display;

determine at least the desktop surface associated with the second physical display from the plurality of desktop surfaces; and cause display of at least the determined desktop surface associated with the second physical display on the second physical display.

* * * * *